United States Patent
Hillier

(10) Patent No.: US 11,852,738 B2
(45) Date of Patent: Dec. 26, 2023

(54) POSITIONING SYSTEM AND METHOD

(71) Applicant: Mitel Networks Corporation, Ottawa (CA)

(72) Inventor: Peter M. Hillier, Ottawa (CA)

(73) Assignee: Mitel Networks Corporation, Kanata (CA)

( * ) Notice: Subject to any disclaimer, the term of this patent is extended or adjusted under 35 U.S.C. 154(b) by 365 days.

(21) Appl. No.: 17/114,035

(22) Filed: Dec. 7, 2020

(65) Prior Publication Data
US 2021/0088619 A1 Mar. 25, 2021

Related U.S. Application Data

(62) Division of application No. 14/803,201, filed on Jul. 20, 2015, now abandoned.

(30) Foreign Application Priority Data

Jul. 22, 2014 (EP) ..................................... 14178078

(51) Int. Cl.
*G01S 5/00* (2006.01)
*H04W 4/02* (2018.01)
(Continued)

(52) U.S. Cl.
CPC .............. *G01S 5/0054* (2013.01); *G01S 1/68* (2013.01); *G01S 5/0036* (2013.01);
(Continued)

(58) Field of Classification Search
CPC .... G01S 5/0242; G01S 5/0284; G01S 5/0289; G01S 5/0054; G01S 1/68; G01S 5/0036; H04W 4/024; H04W 4/023; H04W 4/80
See application file for complete search history.

(56) References Cited

U.S. PATENT DOCUMENTS 6,539,382 B1 3/2003 Byrne et al.
8,060,338 B2 * 11/2011 Damarla ............. G01S 5/02213
702/149
(Continued)

OTHER PUBLICATIONS

Jindan Zhu et al "Improving crowd-sourced Wi-Fi localization systems using Bluetooth beacons", Sensor, mesh and ad hoc communications and networks (SECON), 2012 9th An. IEEE.
(Continued)

*Primary Examiner* — Cassi J Galt

(57) ABSTRACT

A method and system for providing location information to a mobile device includes providing an apparatus with a beacon. The apparatus stores identification information associated with the apparatus, and obtains information describing the correspondence between location information and apparatus identification information to determine the location of the apparatus from the stored identification information. The apparatus transmits the location information to the beacon which transmits the information to the mobile device. In addition, information defining movement of a mobile device through a navigation zone includes an array of beacons that are in communication with each other. The mobile device is provided at a first location in the navigation zone and communicates with a first beacon to indicate its proximity to the first beacon. The device moves through the zone to other locations and communicates with another beacon in proximity to the second location to indicate its proximity to the second beacon.

19 Claims, 5 Drawing Sheets

FIGURE 2

(51) Int. Cl.
*G01S 5/02* (2010.01)
*H04W 4/80* (2018.01)
*G01S 1/68* (2006.01)
*H04W 4/024* (2018.01)
*H04W 4/029* (2018.01)

(52) U.S. Cl.
CPC ........... *G01S 5/0242* (2013.01); *H04W 4/023* (2013.01); *H04W 4/024* (2018.02); *H04W 4/029* (2018.02); *H04W 4/80* (2018.02)

(56) References Cited

U.S. PATENT DOCUMENTS

| | | |
|---|---|---|
| 9,204,251 B1 | 12/2015 | Mendelson |
| 2009/0119756 A1 | 5/2009 | Acuna et al. |
| 2009/0201850 A1 | 8/2009 | Davis et al. |
| 2011/0306357 A1 | 12/2011 | Alizadeh-Shabdiz et al. |
| 2012/0165040 A1* | 6/2012 | Lee ................. H04W 64/00 455/456.1 |
| 2015/0334548 A1 | 11/2015 | Liu et al. |
| 2015/0373482 A1* | 12/2015 | Barnard ............... H04W 4/024 370/338 |

OTHER PUBLICATIONS

Sudarshan S Chawathe "Low-latency indoor localization using Bluetooth beacons", Intelligent transportation systems, 2009 ITSC 12th Int'l. IEEE Conference on, IEEE, Oct. 4, 2009.

Suguna P Subramanian et al "PBIL PDR for scalable Bluetooth indoor localization", Next generation mobile applications, services and technologies, 2009 NGMAST 3rd Int'l Conf.

* cited by examiner

| | |
|---|---|
| A | B: East |
| B | A: West; C: East; H: South |
| C | B: West; G: South; H: South |
| H | B: North; C: North; G: South; M: South; N: South |
| G | H: North; C: North; M: South; N: South |
| M | H: North; G: North; N: East; O: South; P: South; Q: South |
| N | H: North; G: North; M: West; O: South; P: South; Q: South |
| Q | M: North; N: North; P: East; O: East |
| P | M: North; N: North; Q: West; O: East |
| O | N: North; Q: West; P: West |

POSITIONING SYSTEM AND METHOD

CROSS-REFERENCE TO RELATED APPLICATION

This application is a divisional of and claims priority to U.S. patent application Ser. No. 14/803,201, filed on Jul. 20, 2015, which claims priority to European Application No. 14178078.3, filed Jul. 22, 2014, the disclosures of which are hereby incorporated herein by reference.

TECHNICAL FIELD

The present invention relates to a system and method for providing location information, and particularly, but not exclusively, to a system and method for providing location information and information defining movement of a mobile device through an indoor environment.

BACKGROUND

A navigation system requires three elements to operate. The first is a system for determining coordinates, (e.g., x=45.34, y=−75.90 in an x-y plane). The second is a means to resolve those coordinates into terms a human understands (e.g., 350 Legget Drive, Ottawa, Ontario). The third is the ability to understand the paths between two points (source and destination) so that directions can be derived.

The Global Positioning System (GPS) is perhaps the best understood and utilized navigation system today. Unfortunately GPS signals do not penetrate inside buildings, leaving indoor navigation devoid of a single standard solution. Although a variety of methods have been attempted to address indoor navigation, they all experience the same fundamental problems.

A first problem is that of trying to determine the location. The most popular method is trilateration, which is the process of determining the absolute or relative location of points by measuring distances and using the geometry of circles, spheres, or triangles. Rather the measuring distance using traditional means, the strength of a wireless signal can be used to infer distance. Since a mobile device leverages wireless technology, this is the most widely used technique which is used.

A second problem is that of labelling the location with a name which requires human intervention. Typically, a variety of strategies are employed to try to overlay physical Cartesian co-ordinates onto wireless networks, which in turn are overlaid onto maps. This takes considerable effort from a hardware and software perspective, and is often too expensive for average deployments. Even when indoor maps are available, these do not always align with the coordinate system. Typical problems are that RF signal strengths do not directly map (for example, in a linear manner) to building measurements, and the signal strengths can be impacted by walls, furniture, or even people.

A third problem is that of determining the pathways between two points. Typical solutions rely on an "administrator" creating pre-recorded paths through an area populated with sensors. The administrator carries a device which measures direction, speed and so forth. If a person is in proximity to the start of a pre-recorded path, the system can provide guidance to a specified destination.

An alternative model is to use wireless signal strengths to try to estimate a users' position. This requires that the system be "trained" by an administrator, who walks throughout the building taking "fingerprints", which are a snapshot of signal levels at various points of interest, and manually labels the points of interest accordingly (e.g., "Lunchroom"). An individual's location is determined by comparing their signal strengths to the list of fingerprint reference points. Unfortunately this requires at least three signals at different angles of flight to determine an approximate position in a three dimensional plane (e.g., multi-level building), with Wi-Fi signals typically being used for trilateration. A key technical problem with these solutions is that signal propagation is significantly impacted by walls and even people. So as changes to the environments are made, or more or less people are in a given space, erroneous readings occur. Additionally, knowing one's position does not help guide someone to another location.

There is therefore a high degree of human involvement required to install and maintain an indoor navigation system. The hardware providing the signals needs to be installed, and the administrator must then map all strengths throughout the building and label key locations within a database, a term known as "Finger Printing". The administrator must then define all directions between the various permutations and combinations of fingerprints. Once complete, the system can begin operation but ongoing maintenance and adjustment is required to improve the accuracy of the system as wireless signals can deviate as the environment changes (amount of people, etc.).

The present invention is intended to resolve the need for fingerprinting and manual input of routes between fingerprints.

SUMMARY

According to an aspect of the present invention, there is provided a method of providing location information to a mobile device, comprising providing an apparatus with a beacon, in which the apparatus stores identification information associated with the apparatus, the apparatus obtaining information describing the correspondence between location information and apparatus identification information to determine the location of the apparatus from the stored identification information, the apparatus transmitting the location information to the beacon, and the beacon transmitting the location information to the mobile device.

The correspondence between location information and apparatus identification information may be based on a Lightweight Directory Access Protocol, LDAP.

The correspondence between location information and apparatus identification information may be stored at the apparatus.

The location information provided to the mobile device is converted into a position in a predetermined mapping zone may be stored at the mobile device.

According to another aspect of the present invention, there is provided a method of determining information defining movement of a mobile device through a navigation zone, comprising providing the navigation zone with an array of beacons, in which each of the beacons in the array is in communication with one or more other beacons in the array, providing a mobile device at a first location in the navigation zone, the mobile device communicating with a first beacon in proximity to the first location to indicate its proximity to the first beacon, the mobile device moving through the navigation zone to a second location and communicating with a second beacon in the array in proximity to the second location to indicate its proximity to the second beacon, the mobile device providing the second beacon with information defining the direction of movement of the mobile device between the first and second locations, and the second beacon communicating with the first beacon to share the relative positions of the second and first beacons, based on the direction of movement of the mobile device.

The method may further comprise providing navigation information to the mobile device between two locations based on the relative position of beacons respectively located at each of the two locations.

Providing navigation information may comprise determining an optimal route between the two locations, in which the optimal route is a pathway which passes the fewest number of beacons.

The mobile device may determine information defining the direction of movement of the mobile device between the first and second locations based on a sensor in the device, in which the sensor may be a magnetic compass.

The mobile device may further communicate to the second beacon information relating to the signal strength of signals received by the mobile device at the second location from a plurality of beacons in the array, and the second beacon may use the received information to define its position relative to each of the plurality of beacons from which signals are received by the mobile device.

The second beacon may provide information to a third beacon defining the location of the first beacon relative to the second beacon, the third beacon determining its location relative to the first beacon using the received information.

According to another aspect of the present invention, there is provided a system for providing location information to a mobile device, comprising an apparatus storing identification information associated with the apparatus, a beacon provided in proximity to the apparatus, wherein the apparatus is configured to obtain information describing a mapping between location information and apparatus identification information to determine the location of the apparatus from the stored identification information, the apparatus is configured to transmit the location information to the beacon, and the beacon is configured to transmit the location information to the mobile device.

The apparatus may have a fixed location and be a computer or a fixed-line telephone.

The beacon may be arranged to communicate with the mobile device using Bluetooth Low Energy, BLE.

According to another aspect of the present invention, there is provided a system for determining information defining movement of a mobile device through a navigation zone, comprising a plurality of beacons distributed over a navigation zone, in which each of the plurality of beacons is in communication with one or more other beacons of the plurality of beacons, wherein a first beacon in proximity to a first location is arranged to receive information from a mobile device confirming it is in proximity to the first beacon, a second beacon in proximity to a second location is arranged to receive information from a mobile device confirming it is in proximity to the second first beacon, the second beacon is further configured to receive information defining the direction of movement of the mobile device between the first and second locations; and the second beacon is arranged to communicate with the first beacon to share the relative positions of the second and first beacons, based on the received information relating to the movement of the mobile device.

Each beacon array may be connected to a fixed device, or may be a standalone beacon, or the array may comprise a combination of both types of beacon.

Embodiments of the invention provide a method and apparatus to create an adaptive zero touch (in the sense that no manual input is required by a user) location based navigation system. When the hardware is deployed the system will monitor mobile devices to discover, analyze, adjust, and report traffic patterns for user navigation purposes indoors where GPS navigation features do not work. The system can leverage installed desk phones to determine the points of interest within the location, and then offer turn by turn directions to users that are unfamiliar with the environment such that they can find people, places, or things.

By combining hardware into a fixed device such as a desk phone, and leveraging existing protocols such as LDAP, which is used to identify and assign a name and number to the desk phone, fingerprinting can be eliminated and a list of known locations (or points of interest) can be created. All rooms within a location such as an office or hotel that contain a phone will automatically be named (e.g., lobby, front desk, Peter Hillier (office)). The ability to leverage LDAP and existing hardware (e.g., phone systems) to label a building is thus an advantageous aspect of the present invention.

Having established location information, a wired phone network configured with beacons as described above, or alternatively an independent sensor grid, can then begin learning the various pathways that exist within the building, without the use of a map. The algorithm that handles the route and direction-learning (pathways) uses a mobile device's magnetic compass and wireless signals to pass information to the location grid as people move about the building. The paths that people take are "discovered" and then converted to directions which can then be fed to users who are uncertain of the directions to take to get from point A to point B. This information is distributed across the grid so the entire system learns all points of travel.

BRIEF DESCRIPTION OF DRAWINGS

How the information is collected, interpreted, and distributed will be described in more detail below with reference to embodiments of the present invention, which will be presented by way of example only, with reference to the following Figures, in which.

Reference will now be made to the exemplary embodiments illustrated, and specific language will be used herein to describe the same. It will nevertheless be understood that no limitation of the scope of the invention is thereby intended. In the descriptions that follow, like parts are marked throughout the specification and drawings with the same numerals, respectively. The figures are not necessarily drawn to scale and certain aspects are shown in exaggerated or generalized form in the interest of clarity and conciseness.

DESCRIPTION OF THE APPLICATION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "mobile device" refers to a device capable of wireless digital communication such as a smart phone, a tablet computing device, a laptop computer, a multimedia device or other type of device that provides text or voice communication.

The terms "location" and "position" are used synonymously throughout the specification so as to define where the mobile device is in a particular environment. The location or position may be defined as absolute co-ordinates, or with respect to pre-configured information such as points of interest on a map.

The following description is generally divided into two sections. The first section relates to a method and system for determining the location of a mobile device. The second section relates to method and system for determining information characterising the motion of the mobile device between two locations, and to providing navigational information to guide a user of the mobile device between two locations. The method and system for determining information characterising the motion of the mobile device may make use of the method and system for determining the location of the mobile device according to embodiments of the present invention. Both techniques share common advantages in terms of the avoidance of manual fingerprinting, as described above.

Determining Locations

Figure 1:
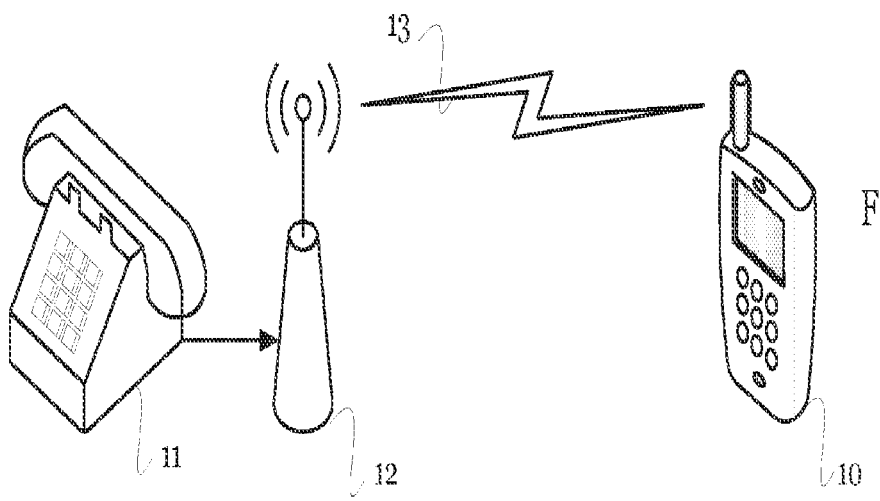
FIG. 1 shows a system used in determining location information according to an embodiment of the present invention.

FIG. 1 illustrates a system diagram comprising the components required to determine the location of a mobile device according to an embodiment of the present invention. The system comprises a mobile device 10, a fixed device 11, and a location beacon 12. The system is particularly advantageous over conventional positioning systems when arranged in an indoor environment, but the system is also operational in outdoor or partially indoor environments.

The fixed device 11 is typically a component of office equipment, such as a fixed-line desk phone or a PC. The location beacon 12 is integrated with, or in proximity to, the fixed device 11, such that the location of the location beacon 12 substantially corresponds to the location of the fixed device 11.

The location beacon 12 comprises a radio that emits and detects signals 13 based on the Bluetooth® Low Energy (BLE) protocol. The mobile device 10 supports BLE and is thus able to communicate with the location beacon 12. A BLE location beacon is particularly advantageous as it typically has low cost, small size, is robust and efficient, and has low power requirements, meaning that it can be either battery-powered, or can derive power from the fixed device with which it is associated, using, for example, a Universal Serial Bus (USB) connection. It is thus a particularly suitable protocol for discrete low-data transfers as used in provision of location information. Another benefit lies in the ability of BLE devices to transmit and receive signals using a single radio antenna through appropriate switching of their advertising mode, in contrast to Wi-Fi-based radio systems which must periodically switch between server and client modes in a data exchange.

The location beacon 12 is "named" according to the fixed device 11 with which it is associated. The location beam 12 derives its name by communication with the fixed device 11, which is in turn named using a protocol such as Lightweight Discovery Access Protocol (LDAP). As an example, a desk phone typically knows its extension number through configuration of the phone itself, or through derivation of information via the phone network. Using LDAP, the desk phone can learn the name of a user associated with that extension number. Consequently, the desk phone can deduce that it is in an office belonging to the user associated with the extension number, and this serves as location information. The location information is transmitted to the location beacon 12 which can in turn provide it to the mobile device 10 using BLE communication.

In a similar way, a network of existing desk phones within a building can be used to compile a list of locations, so that the user of a mobile device 10 can determine its location in the building based on its nearest desk phone, configured with a respective location beacon 12. It will thus be appreciated that location information can be provided throughout the building without, or with a substantially reduced need for an administrator to perform a finger printing process.

The location information is provided using an elegant solution because all that is added to the existing office hardware is the location beacon 12, which in turn is configured effectively because it can leverage location information associated with the office hardware which has already been configured. As described above, in an embodiment, the configuration of the location information may be achieved using LDAP, but other systems are possible such as the maintenance of a server or database storing a mapping between information known to the fixed device, such as its extension number, and user information. This mapping may take the form of a telephone directory, for example. In an alternative embodiment, in which the fixed device is a Personal Computer (PC), the PC may be associated with a number of different means of identification, such as a Media Access Control (MAC) address assigned to the network controller of the PC, or an internet protocol (IP) address dynamically assigned using the Dynamic Host Configuration Protocol (DCHP). In this example, the mapping between users or physical locations and the IP address may be maintained at a DCHP server, which the fixed device can access in order to determine its location.

It will be appreciated that the system set out above is applicable to both location information provided for a single office floor, or to multiple floors in a three-dimensional building layout. It will also be appreciated that the system could be distributed over a number of buildings, or a site or university campus containing a combination of indoor and outdoor zones. In such locations, the system could be combined with GPS systems for outdoor navigation in the event that a beacon signal cannot be received.

The description of the system above assumes that a signal from a beacon signal is always available for receipt by the mobile device 10. It is possible, however, that in some configurations, there may be a "blackspot" which is not covered by a location beacon, or a beacon may malfunction due to battery failure, or an associated failure with its respective fixed device. In such circumstances, the mobile device to may provide an error warning to a user via an interface hosted by an application running on the mobile device to, which alerts the user to the fact that location information may be limited or inaccurate, so that the user can modify the system accordingly for future navigation.

Having received location information from the location beacon, a mobile device 20 interprets the received location information using a mapping application 22 running on the mobile device 20. The mapping application 22 is typically configured to enable communication with the BLE communications modules 23 of the mobile device 20 via the central processing unit 21 of the mobile device, so as to control transmission and receipt of data, and to enable presentation of the data via display 24.

Figure 2:
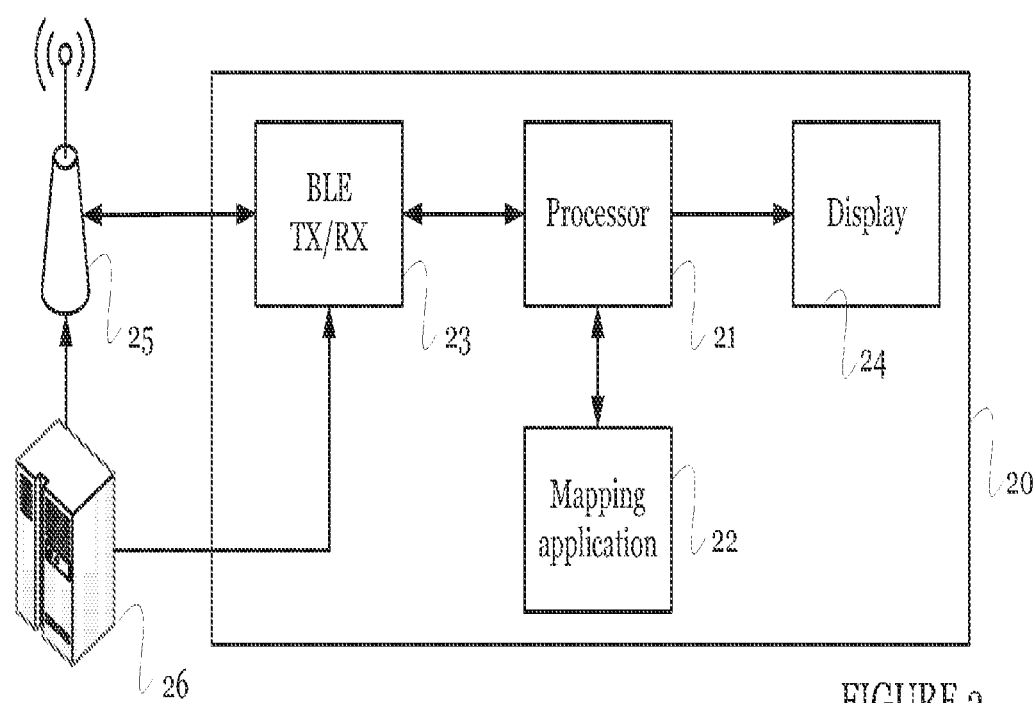
FIG. 2 shows a system used in presenting location information to a user of a mobile device, according to an embodiment of the present invention.

The arrangement of a mobile device 20 according to an embodiment of the present invention is shown in FIG. 2, with components of the mobile device 20 contained within the dotted line. The mapping application 22 hosted on the mobile device 20 contains graphical components required for the generation of a map image, and the mobile device 20 is also arranged to communicate with components hosted remotely, such as on a cloud system, the internet, or a local server 26 associated with an office building as shown in FIG. 2, which maintains the correspondence between points of interest with which a location beacon 25 may be associated, and physical locations or user names. Location beacon 25 operates in the same way as location beacon 12 described in connection with FIG. 1.

The mapping application 22 receives the information relating to the correspondence or mapping between points of interest and physical locations and generates, and this information may be stored locally in a memory (not shown). The mapping application 22 generates an appropriate graphical layout which enables the user of the mobile device 20 to visualise locations. The layout may show aspects of a building, such as walls, doors, or may be a simpler logical layout showing a grid representing the entire office zone. In order to facilitate the operation of the mapping application 22, certain graphical elements may be pre-stored at the mobile device 20 in a memory (not shown), since a building's physical layout is unlikely to change significantly over time.

It is, of course, possible that the distribution of workers throughout a building layout may change over time, and this information will require dynamic updating. For example, the correspondence information held at the mobile device may state that office number 2-B-36 is that of Mr. Peter Hillier on floor 2, wing B, pod 36 of an office layout, but due to a change in circumstances, Peter Hillier has recently moved to office 4-A-15. The telephone directory of the office may have been updated accordingly, so that Peter has the same extension number in his new office, even though he may be making use of a different fixed desk phone. Accordingly, a new location beacon associated with the desk phone in office 4-A-15 is able to identify itself as in Peter's office, but the map stored at the mobile device assumes that Peter's office is 2-B-36. Accordingly, the mapping application is arranged to interface with components such as the directory module 26 so that location received from a location beacon 25 can be represented properly on a map displayed to the user.

In the embodiments described above, it has been assumed that the fixed device 11 has a location which does not change (or that changes infrequently per the example of moving offices above). It will be appreciated, however, that the fixed device 11 may instead be mobile. As used in this context, the term "mobile" is intended to apply to both a device which is continually moving, or a device which periodically moves between different fixed locations. This configuration is suitable where a user of a first mobile device is attempting to determine a location relative to the user of a second mobile device, in the event that the user of a second mobile device is away from their usual fixed location, either being temporarily at a new location, or walking around an office, for example. The "mobile" configuration embodiment is also suitable where a shared resource, such as a projector unit or speaker phone, is moved between conference rooms in an office building when needed, and the resource does not have a "default" location in the sense of the fixed device previously described.

In this embodiment, the second mobile device takes the place of an integrated combination of the fixed device and the location beacon. The second mobile device may define its own location with respect to a further location beacon in the manner described above, so that the first mobile device may determine an absolute location based on the absolute location of the second mobile device, and its location relative to that of the second mobile device. A projector unit could be "tagged" with a BLE sticker, for example, and its location determined on the basis of its proximity to a beacon.

Alternatively, only a relative position between the first and second mobile devices is required, so that the user of the first mobile device can determine a direction to the second mobile device. In this embodiment, the second mobile device could continually broadcast its position as it moves through a particular zone, together with mobile subscriber information associated with the second mobile device (such as user name, mobile phone number), so that the first mobile device can determine its position accordingly.

In either of these two embodiments, once a series of fixed endpoints are known it becomes possible to track users. For example, if Peter is in Jonathan's office, Peter's mobile phone will report its location information as "Jonathan's Office". So people who want to find Peter can do so, even if Peter is not at his desk, by navigating to the closest fixed location that Peter's mobile device is reporting. Peter's device thus reports the closest beacon as a means of identifying itself in proximity to a known location.

In a further embodiment, location beacons may be associated with both fixed and mobile devices, referred to hereinafter as an "apparatus", which represents a combination of the embodiments described previously, enabling a combination of location information taking advantage of existing hardware, and location information taking advantage of the previously-established location of another mobile device. Whether or not the apparatus is fixed or mobile, the advantage of not requiring an administrator to perform manual fingerprinting is provided.

Determining Directions

Embodiments of the present invention are also capable of identifying pathways through a navigation zone in order to provide navigational guidance to a user. Such pathways are initially identified through a "learning" process, as described below in more detail. In general terms, embodiments of the invention may make use of a location beacon 12 of the type used in the system of FIG. 1, such as a location beacon 12 adjacent to a desk phone 11, or a standalone beacon which is not associated with any hardware. Such a standalone beacon may be connected to a power socket, for example, or may simply be positioned on a wall while operating on battery power. In the following embodiments, the terms "beacon" or "sensor" are used interchangeably as a generalisation of these two types of configuration.

Pathways are defined as routes which a user of a mobile device may take to move between two locations or "nodes"

in an area which will be referred to hereinafter as a "navigation zone". It will also be appreciated that the navigation zone may be a three-dimensional volume. Multiple pathways may exist for a particular pair of locations, and embodiments of the present invention are able to identify an optimal pathway for a user to take.

According to embodiments of the present invention, the navigation zone is provided with a plurality of spatially distributed beacons. The beacons may be positioned as a regular array, but may also represent an irregular array, corresponding to the locations of points of interest in the navigation zone, such as offices 31, elevators 32, and staircases 33 in a building.

Figure 3:
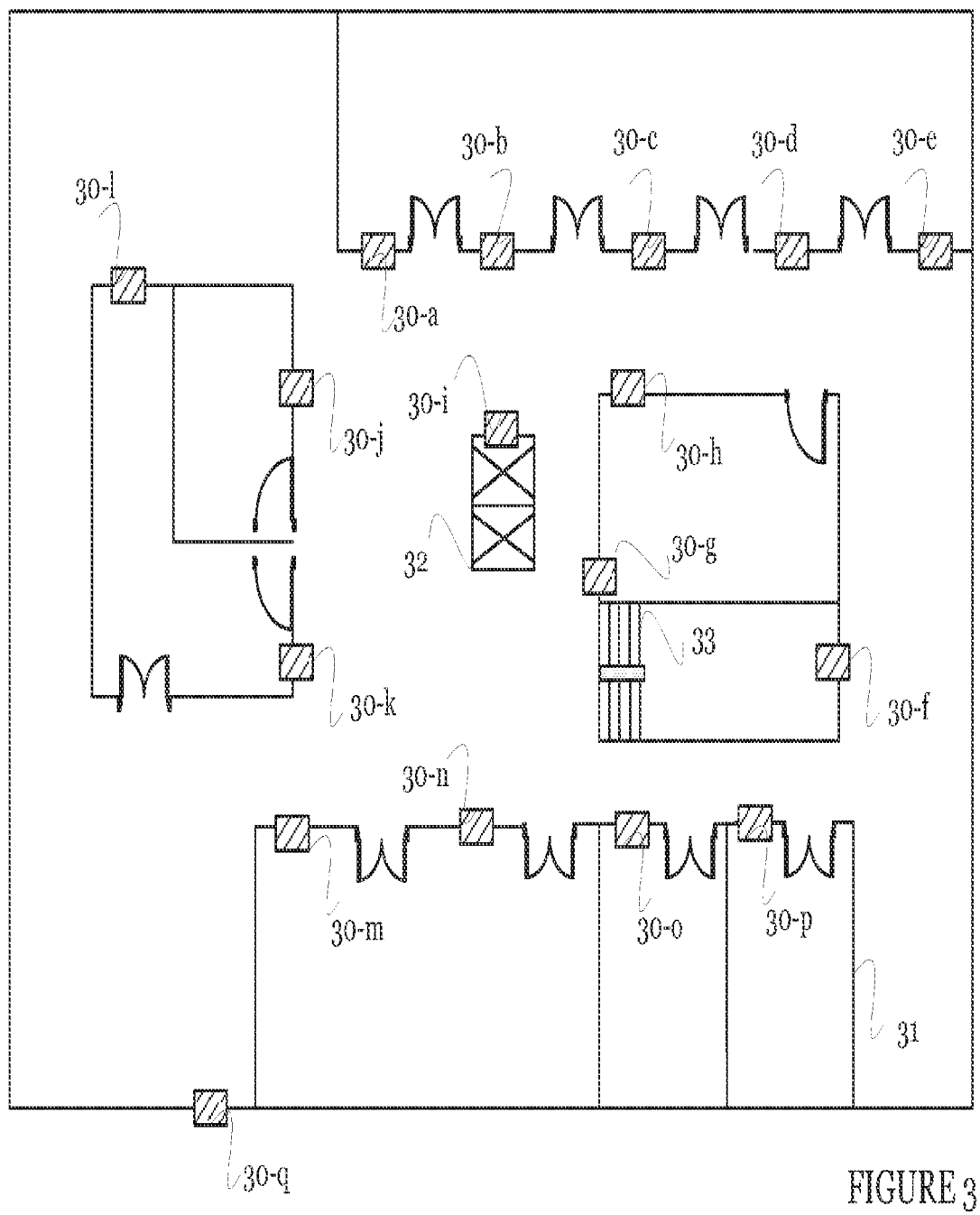
FIG. 3 shows a navigation zone equipped with a beacon array according to an embodiment of the present invention.

An example is shown in the simplified office layout shown in FIG. 3. Each of the beacons 30-a, 30-b, 30-c, 30-d, 30-e, 30-f, 30-g, 30-h, 30-i, 30-j, 30-k, 30-l, 30-m, 30-n, 30-o, 30-p, 30-q in the beacon array can communicate with one or more other beacons in the array. Consequently, there are one or more communication paths between any given pair of beacons in the array. When initially setting up the beacon array, it is first established that a first 30-a and second 30-b beacon can communicate with each other before a third beacon 30-c is added to the array in communication with the first 30-a and/or second 30-b beacon. Establishment of a connection between the first and second beacons 30-a, 30-b may be based on the completion of a handshaking protocol, or exchange of messages, as confirmed to a user via a signal detection LED on each of the first and second beacons 30-a, 30-b. If no connection has been established, one of the first or second beacons 30-a, 30-b must be moved so that it is within range. Normal operation of each the beacons 30-a, 30-b can also be confirmed using a separate "power on" or status LED.

Having completed the array of beacons 30 in this manner, the system is ready to begin learning, so that the navigation zone as a whole can be mapped. In operation, each of the beacons 30 in the array periodically, or continually, transmits information identifying itself. The identification may be the result of an enumeration process in which each beacon in the array is assigned a number based on a particular scheme, such as physical position, or connection order. An example of an enumerated beacon array is shown in FIG. 4, showing beacons 40 labelled alphabetically from A to U.

Figure 4:
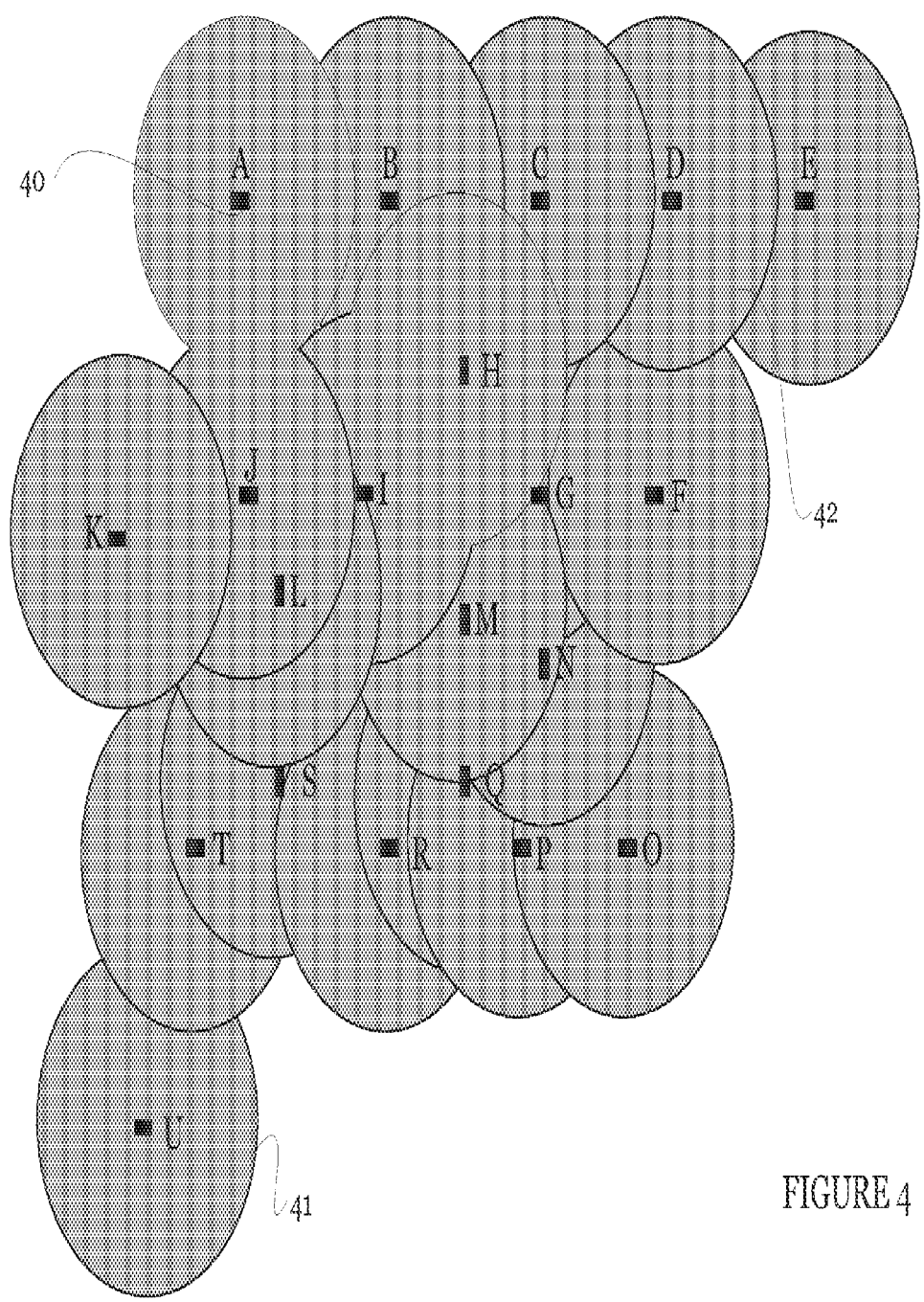
FIG. 4 shows an example of an enumerated beacon array used in the embodiment shown in FIG. 3.

Each beacon 40 in FIG. 4 is shown with a circular transmission zone 41 surrounding it, shaded in grey, which indicates the area within which a signal could be expected to be detected by a mobile device. Each of the beacons 40 is shown as having the same sized transmission zone 41, representing equal signal strength in all directions, and equal signal strength for each of the beacons, but it will be appreciated that beacons 40 may have different signal strengths depending on the specific physical design parameters of the beacon, or depending on its location. A fire escape, for example, may be regarded as a high priority point of interest in a building, such that it is associated with a beacon having a higher signal range, or frequency of reporting, than other beacons in the building. Although circular transmission zones are shown, it will be appreciated that the transmission zones are three-dimensional (e.g., spherical) in nature.

FIG. 4 also illustrates a number of overlapping zones 42 in which signals can be received from multiple beacons. This reflects the requirement that each beacon in the navigation zone is able to "see" (i.e., communicate with) one other beacon, to enable propagation of information as described below.

As a mobile device moves through the beacon array, it uses an application that reports the direction of movement of the mobile device. The direction of movement may be identified using hardware such as a magnetic compass, or directional accelerometer. The mobile device also reports those signals that it can receive from beacons 40 in the array. The reporting is carried out each time a beacon 40 is detected by the mobile device, and the reporting takes the form of a message communicated to the beacons 40 using the BLE protocol, either as a single instance, or as a repeated communication.

In addition to communications and processing circuitry, each beacon 40 contains memory for storing data. The memory is for storing the identification assigned to the beacon during the enumeration process. In addition, the memory stores the information received from the mobile device so that each beacon 40 can share the data with neighbouring beacons, such that all beacons 40 in the navigation zone build up an identical table of information indicating the nearest neighbour to a particular beacon, and the relative direction to that beacon.

Figure 5:
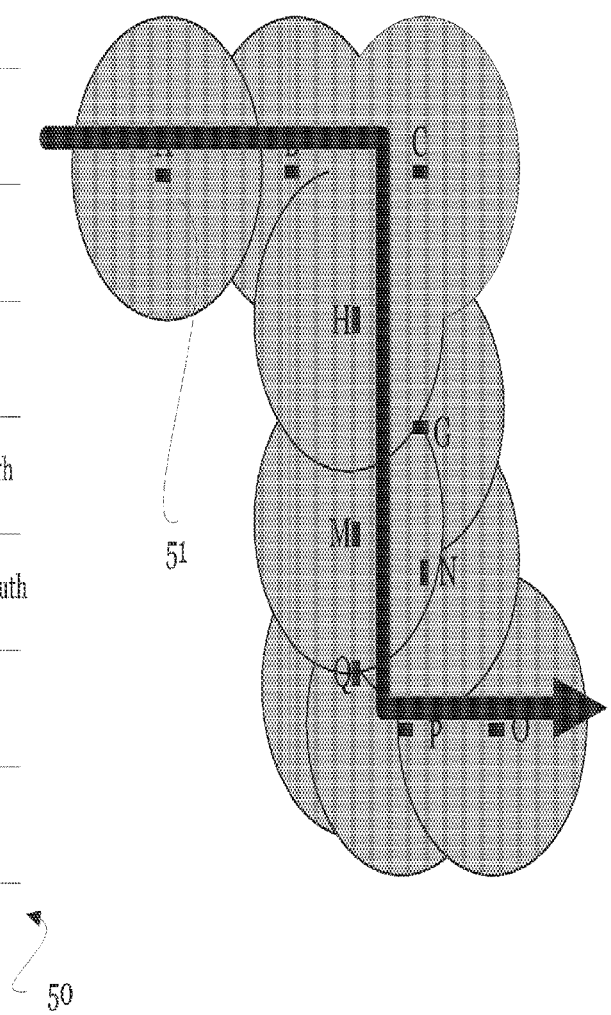
FIG. 5 shows a nearest-neighbour table constructed for a portion of the enumerated beacon array of FIG. 4.

An example of such as a table 50 is shown in FIG. 5, which is generated as a mobile device moves along a particular pathway 51 through the navigation zone, also shown in FIG. 5. From this table 50, it can be determined that beacon A has beacon B as a neighbour to the East. Beacon B has beacons A (West), C (East) and H (South) as neighbours. Beacon C has beacons B, G and H as neighbours, and so on. Motion information from the mobile device leads to the establishment that a pathway running East/West reaches beacons A, B, C and H. A pathway running North/South reaches beacons C, H, G, M, N, Q and P. In this example, only the discrete compass-directions are shown in Table 5, although it will be appreciated that since typical mobile devices are capable of determining bearings to three significant figures or greater, more detailed information will be stored by each beacon in some embodiments.

From the table 50 in FIG. 5, it can be further calculated that if beacon A is detected by the mobile device, and the device wishes to travel to beacon O, a course can be created which takes the East/West pathway from beacon A to C, the North/South pathway from beacon C to P, and the East/West pathway from P to O. The entire navigation zone can be similarly mapped, and a series of pathways constructed.

Figure 6:
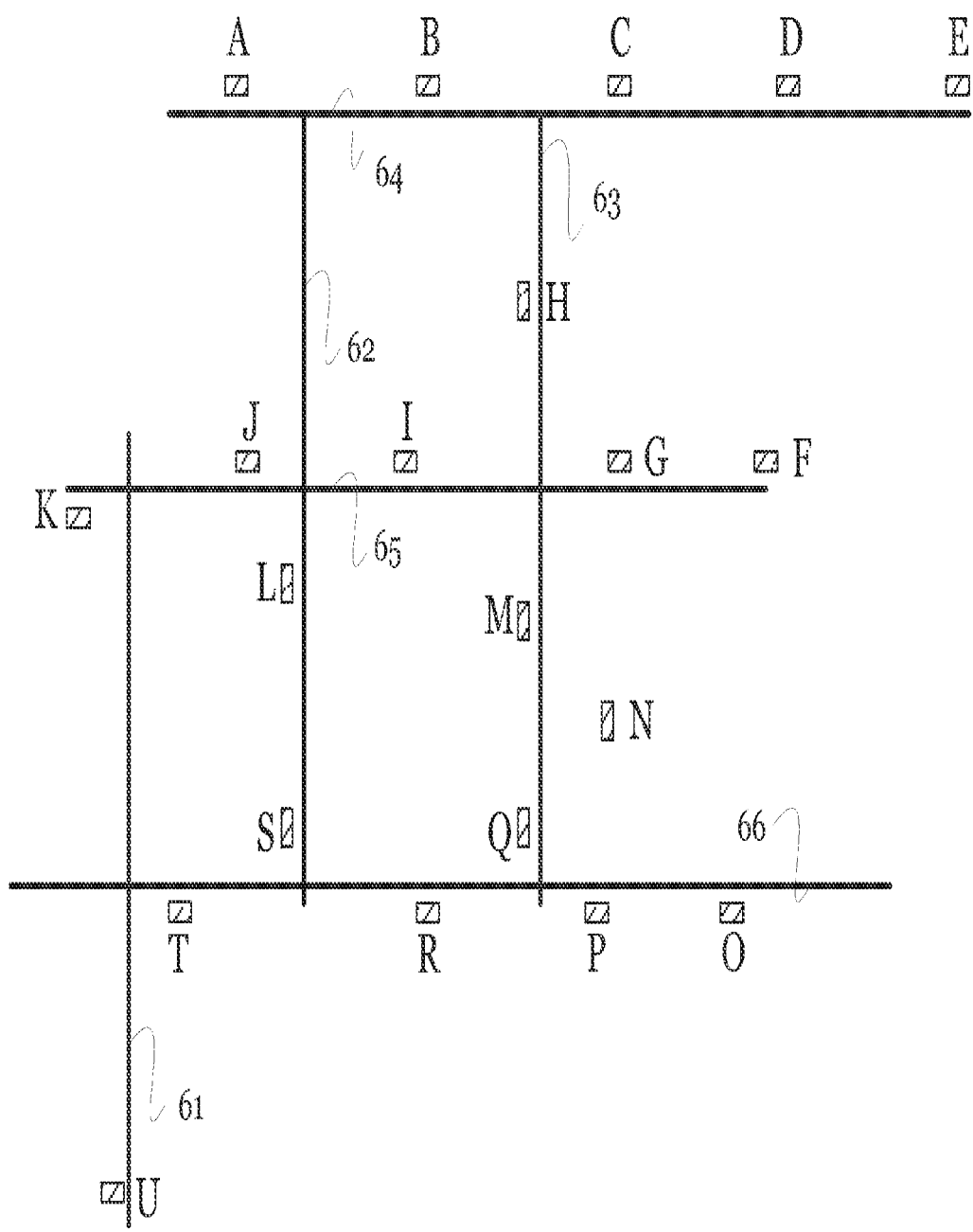
FIG. 6 shows an example of pathways throughout the navigation zone represented in FIG. 4.

FIG. 6 illustrates an example of the pathways 60 through the beacon array of FIG. 4, based on the information for the entire beacon array, having the structure of that contained in the table of FIG. 5.

In FIG. 6, three North/South pathways 61, 62, 63 and three East/West pathways 64, 65, 66 are shown. Although in general, each beacon is shown as close to a particular pathway, it is not necessary that this is the case. As an example, beacon N is shown as more distant from a pathway than any of the other beacons, but the pathways surrounding it may pass through the transmission zone associated with that beacon, so that the pathway is valid in the sense of a logical connection representing the use of beacon N in defining transit between beacons M and Q, for example. The variation in the position of a beacon relative to a pathway is also reflective of the fact that in physical terms, it may not be possible to plot a straight line through an office between beacons H and Q, due to the shape of a corridor for example, and so to interpret the pathways as logical instructions, based on the table of FIG. 5, enables the user to effectively translate the pathways into physical pathways when walking through the office in accordance with logical guidance information as described below.

The pathways of FIG. 6 illustrate that there are a number of different pathways between the same pair of beacons. As an example, to travel from beacon A to beacon G, paths 64, 62 and 65 could be taken, but instead, paths 64, 63 and 65 could be taken. The beacon array of the present invention is able to determine an optimal route between two beacons which is that which crosses the fewest beacons. In cases where two routes cross the same number of beacons, either two routes can be identified as alternatives, or signal strengths can be analyzed for greater accuracy where there are a many pathways, for example through cubicles in an office. The strengths of signals received at a mobile device are measured to provide an indication of proximity to a beacon. Consequently, while it might be established that it is possible for the mobile device to travel between two locations by crossing through the transmission zones of particular intermediate beacons, it might also be established that some of those beacons are positioned further away than others. As such, the optimal route between two locations may be determined more accurately by taking into account how close to a particular beacon the mobile device needs to be to successfully transition from the transmission zone of that beacon to another beacon.

Routes between beacons can be stored in the memory of each beacon in the array for later use in provision to a mobile device requesting navigational guidance. Alternatively, the routes may be calculated "on-the-fly" when required by a processor in the beacon, but preferably, the beacon transmits information to the mobile device representing the content of the table 50 of FIG. 5, and a navigation application hosted by the mobile device is capable of analysing the information to determine an optimal pathway. This arrangement harnesses the greater processing power of a mobile device in comparison to that of a beacon.

Directions can be provided to a user of the mobile device "turn-by-turn", using a the navigation application running on the mobile device. Each successive direction is triggered by the detection of a beacon signal by the mobile device. For example, the application tells the user to proceed West through the navigation zone from beacon A. When the mobile device detects beacon H, a right turn is instructed so that the user heads South along the North/South pathway. When beacon P is detected, the application alerts the user to take the next left so as to travel East to beacon O.

Because the beacons communicate with each other (in addition to the mobile device), they can share pass data received from the mobile device throughout the entire beacon array. The navigation application on the mobile device therefore only needs access to a single beacon to be able to obtain navigation instructions.

The embodiments described above make use of an enumeration scheme to identify each of the beacons in the array. Where the beacons are connected to fixed devices in the way of the embodiment shown in FIG. 1, the present invention may take advantage of identification information associated with fixed devices so that the beacons are identified as corresponding to the users of offices. Instead of providing navigation information step by step and relying on detection of particular beacon signals before a next instruction is provided to the user, an entire set of navigation instructions can thus be provided to a user in advance, in a form which can be easily interpreted. For example, the instructions may be of the form "Head South to Sarah's office, turn right and head West until you reach Michael's office, and then the elevators will be to your right". To provide the user with an indication of progress, portions of the navigation information, such as "now turn right" can be repeated to the user when certain points of interest are reached. In addition, the navigation application can be arranged to interface with, or integrated with, the mapping application described with reference to FIG. 2, so that the progress of the user can be confirmed on a map on the user's mobile device, which is useful in the event the user is unfamiliar with the identity of the points of interest.

It will be appreciated that modifications to the embodiments described above may be made above which fall within the scope of the invention as defined by the claims, based on interchange of some or all of the described or illustrated elements. For example, any low power communication protocol may be used for communication between the beacons and the mobile device, and the specific use BLE is not essential. Zigbee®, Zigbee® RF4CE, ANT®, ANT+®, IrDA®, Wi-Fi® and other wireless signals provide suitable alternatives. Similarly, alternatives to LDAP for labelling beacons with location information will be apparent, such as a reverse phone lookup service (e.g., "reverse 411") which will take a number and provide a name for that number, or the MAC address and/or IP address-based embodiment described. Another alternative would be the manual configuration of the labelling of devices as part of an "initialisation" process. Similarly, it has been described above that beacons may each locally store information identifying nearest neighbours or pathway information. As an alternative, groups of beacons may share access to a central memory at which the relevant data is stored in correspondence with a beacon, where the storage capacity of an individual beacon is small. Embodiments may be combined in a number of ways as set out above, for example the combination of the positioning embodiments with the pathway-learning embodiments, while retaining the benefits of the invention set out in this disclosure.

Moreover, where certain elements of the present invention can be partially or fully implemented using known components, only those portions of such known components that are necessary for an understanding of the present invention are described, and detailed descriptions of other portions of such known components are omitted so as not to obscure the invention. In the present invention, an embodiment showing a singular component should not preclude other embodiments including a plurality of the same component, and vice-versa, unless explicitly stated otherwise herein. Further, the present invention encompasses present and future known equivalents to the known components referred to herein by way of illustration.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are intended to be encompassed by the claims.

What is claimed is:

1. A system for determining information defining movement of a mobile device through a navigation zone, comprising:

a first location beacon, positioned in proximity to a first location in the navigation zone, receiving information from the mobile device confirming its proximity to the first location beacon; and a second location beacon, positioned in proximity to a second location in the navigation zone, receiving information from the mobile device confirming its proximity to the second location beacon;

wherein the second location beacon receives information defining a direction of movement of the mobile device between the first and second locations; and wherein the second location beacon communicates with the first location beacon to share relative positions of the first and second location beacons based on the direction of movement of the mobile device.

2. The system of claim 1, wherein the first location beacon and the second location beacon are configured to determine an optimal route for the mobile device and communicate with the mobile device to cause the mobile device to move along the optional route, wherein it passes a fewest number of location beacons in an array of location beacons.

3. The system of claim 2, wherein the optimal route is stored by a storage of the first location beacon and a storage of the second location beacon.

4. The system of claim 1, wherein the second location beacon receives from the mobile device information relating to signal strength of signals received by the mobile device at the second location from a plurality of additional location beacons in an array that includes the first and second location beacons and wherein, in response, the second location beacon defines its position, based on the signal strength of the signals, relative to each of the plurality of the location beacons from which the signals are received by the mobile device.

5. The system of claim 1, wherein the second location beacon provides information to a third location beacon in the navigation zone defining a location of the first location beacon relative to the second location beacon and wherein, in response, the third location beacon determines its location relative to the first location beacon using the information received from the second location beacon.

6. A system for determining information defining movement of a mobile device through a navigation zone, comprising:

a plurality of beacons distributed over a navigation zone, wherein each of the plurality of beacons is in communication with one or more other beacons in the plurality of beacons;

a first beacon of the plurality of beacons positioned in proximity to a first location and operated to receive information from the mobile device confirming it is in proximity to the first beacon; and a second beacon positioned in proximity to a second location and operated to receive information from the mobile device confirming it is in proximity to the second beacon, wherein the second beacon is further configured to receive information defining a direction of movement of the mobile device between the first and second locations, and wherein the second beacon communicates with the first beacon to share relative positions of the first and second beacons based on the received information relating to the movement of the mobile device.

7. The system of claim 6, wherein at least one of the plurality of beacons is configured to transmit location information to the mobile device.

8. The system of claim 1, wherein either the first location beacon or the second location beacon is configured to transmit the location information to the mobile device.

9. The system of claim 6, wherein the second beacon provides information to a third beacon in the navigation zone defining a location of the first beacon relative to the second beacon and wherein, in response, the third beacon determines its location relative to the first beacon using the information received from the second beacon.

10. The system of claim 6, wherein the first beacon and the second beacon provide navigation information to the mobile device based on the relative position of the first beacon, which is located at a first location, and the relative location of the second beacon, which is located at a second location.

11. The system of claim 10, wherein the providing of the navigation information by the first beacon or the second beacon comprises determining an optimal route between the first location and the second location.

12. The system of claim 11, wherein the optimal route is a pathway that passes a fewest number of the plurality of beacons.

13. The system of claim 6 further comprising a display on the mobile device that is configured to display a representation of the navigation zone.

14. The system of claim 13, wherein the display is further configured to display an optimal route.

15. The system of claim 6, wherein the mobile device further includes a sensor configured to determine the direction of the movement of the mobile device.

16. The system of claim 15, wherein the sensor comprises a magnetic compass or a directional accelerometer.

17. The system of claim 6 that further comprises a third beacon in the plurality of beacons.

18. The system of claim 6, wherein the mobile device comprises a mapping application containing graphical components configured to generate a map image.

19. The system of claim 18, wherein the mapping application interfaces with a directory module so the application of the mobile device is received from one of the plurality of beacons.

* * * * *